Jan. 8, 1946.  B. F. W. HEYER  2,392,737
BATTERY CAPACITY TESTER
Filed Aug. 3, 1942
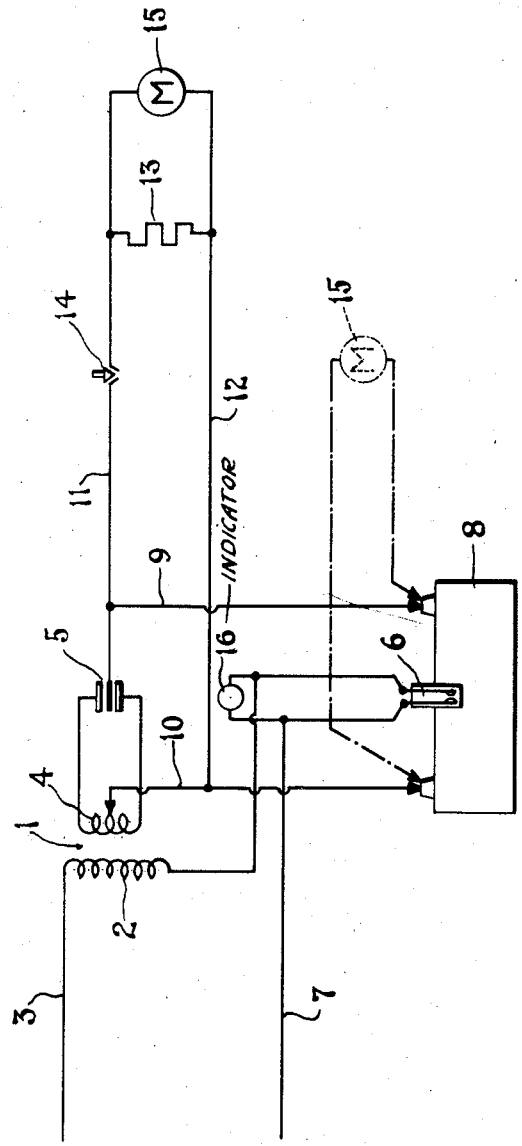
INVENTOR.
Benjamin F. W. Heyer
BY
ATTORNEY Patented Jan. 8, 1946

2,392,737

UNITED STATES PATENT OFFICE 2,392,737

BATTERY CAPACITY TESTER

Benjamin F. W. Heyer, Tenafly, N. J., assignor to Knickerbocker Development Corporation, Belleville, N. J., a corporation of New Jersey Application August 3, 1942, Serial No. 453,360

7 Claims. (Cl. 320—20)

This invention relates to a new and useful improvement in battery capacity testers. Its purpose is to provide a testing device for storage batteries in which the many inaccuracies inherent in present testers are eliminated so that the instrument is more useful and valuable.

Testers for storage batteries may be divided into two main types. The first type may be called a battery condition tester, which utilizes differences in cell voltage when the battery is under heavy discharge. The second type may be called a battery capacity tester, in which a comparison is made of the actual capacity of the battery under test with its original or rated capacity when new.

Battery condition tests are purely comparative, and are embodied in the earliest types of testers. A heavy current of from 100 to 300 amperes is drawn from the battery, and while this current is flowing, the voltage of each cell is compared with others. The only requirement for the test is that the battery must still have sufficient charge in it to maintain the heavy discharge rate during the test period, of, say, from 30 to 60 seconds, which usually means that the battery must have a specific gravity of 1,200 or more. The size of the battery, its temperature, or state of charge, has no influence on this kind of test.

Since all cells of a storage battery are substantially identical when manufactured, and are charged and discharged in series, they should wear at substantially the same rate. When a cell, with the battery under heavy discharge, shows a lower voltage than another cell, it is a sign of weakness, such, for example, as cracked separators, shortage, broken, or sulphated plates, low electrolyte, or short circuits, between cell partitions. The defect in this type of test is, obviously, that it only compares the cells of a battery with each other, so that if the cells have worn evenly, no difference will appear even though they may have lost much of their rated capacity, and the battery is comparatively worthless.

For really informative tests what is needed is a means of comparing the cells, not with each other, but with what they were when new; in other words, with a standard. This is called "capacity testing" and a device for this purpose is the subject of this invention.

To make a capacity test it is essential that the battery be fully charged. Should a test be made under other conditions, the reading would indicate under capacity, but there would be no means of telling if the battery simply needed charging or actually was partially worn out. Therefore, to prepare the battery for testing it is first given as full a charge as it will take.

The rate of charging by the old style chargers was so slow that it required from 10 to 30 hours to charge a battery, making it necessary to remove it from the car and to install a rental battery. Also, because of the heating of the battery during charge, which depends upon the size and condition of the battery, ambient temperature, the rate of charge, etc., no accurate test could be made without either correcting for such error-producing factors, or allowing the battery to stand from 6 to 12 hours, until it reached the so-called "room temperature" of from 70 to 80 degrees F. Further, when a battery is charged, surface charge develops. While this is present, the battery will display a voltage somewhat higher than normal. This is deceptive, because it is purely superficial, and will not be maintained for any considerable period, but will be dissipated in a few hours. However, since surface charge will, unless compensated for, affect the result of a test, it has been necessary to let the battery stand for from 6 to 12 hours to become normal in this respect. In short, by the old methods, a battery could not be safely tested until it had stood idle for about 24 hours after charging had been completed.

Modern methods require that batteries should be charged very rapidly and tested immediately. Chargers have been developed and are in widespread use which will supply a charging rate of from 80 to 100 amperes and will charge the battery in from 30 to 60 minutes. This method of charging heats up the battery rather rapidly, and experience has proved that the temperature cannot safely exceed 130 degrees F. When this temperature is reached, most batteries will be found to have about 80% of their full charge. Although the battery is, obviously, not then fully charged, nevertheless the high charging rate will have charged the surfaces of the plates and some of the underlying material, to the maximum so that for testing purposes by means of the present invention, which usually takes from 10 to 30 seconds, the battery may be considered fully charged and the results of the test will be found to be the same as though it were actually fully charged.

The basic idea underlying the capacity tester of this invention is to first establish a predetermined temperature within the battery of, say, 130 degrees F. by charging at a rate sufficient to produce surface charge and then to test it by drawing a predetermined current from it, or a cell thereof, and determining the terminal voltage as compared with that actually shown by the same size of battery when new and at the same temperature.

A form of the tester of this invention meeting the above requirements is shown in the drawing. As shown, it consists of a transformer 1, one end of the primary 2 of which is connected to one side 3 of a suitable source of A. C. current. The secondary 4 is connected to a rectifier 5 of any suitable type, preferably a copper oxide rectifier. Because of the necessity for speed let it be assumed that the transformer and rectifier are suitably designed to deliver a current of from 50 to 125 amperes to the battery, which should be sufficient to give the battery all the charge it can safely take in from 30 to 60 minutes. As already stated, this will, as a general rule, produce a charge of about 80% by the time the battery has reached a temperature of 130 degrees F.

The other end of primary 2 of transformer 1 is connected to a thermostatic switch 6, which is also connected to the other side 7 of the alternating current supply. Thermostatic switch 6 is contained in an acid- and leak-proof housing, which can be inserted into the electrotype of the battery 8 through the vent hole of any one of the cells. It has no electrical connection with the electrolyte or the plates. It is so designed that it is normally closed, but will open when the electrolyte of the battery has reached the "test temperature" of 130 degrees.

The battery to be tested is connected to the output of rectifier 5, as indicated by lead 9, and to the midpoint of the secondary 4 of the transformer 1, as indicated by lead 10. The out-put of rectifier 5 is also connected to a circuit 11 and 12, in which a calibrated discharge resistance 13 is included, to supply a suitable load. Also, in this circuit is a switch 14, preferably of the push-button type, which is normally open so that the circuit is normally open.

Across this circuit a voltmeter 15 may also be bridged but, preferably, this voltmeter is connected directly across the battery terminals as shown in dotted line in the drawing. This permits the use of much smaller copper charging and testing leads, which would produce serious errors in the reading of voltmeter 15 were it connected directly across resistance 13, as the result of the loss of voltage due to heating of the leads.

To indicate when the predetermined test temperature has been obtained, an indicator 16, which may be a light, or a bell, or any other suitable device, may be connected across thermostatic switch 6. In the circuit shown the resistance of this indicator should be such that it will not operate until the thermostat 6 opens, or, in other words, until the full current from the A. C. current source is able to pass through it.

The battery may be tested without disconnecting it or removing it from the car. It is brought up to the predetermined test condition, or, in other words, the temperature of the electrolyte is raised to 130 degrees F. by means of the heavy current of from 50 to 125 amperes produced by the rectifier. When this has been attained, the battery, regardless of its size, condition, or the length of time the current has been flowing into it, will have about 80% of the charge which it is able to take. This, as already explained, for test purposes, is equivalent to a full charge. The thermostatic switch 6 will then open to break the A. C. circuit and terminate the flow of current to the battery. Indicator 16 will then function to tell the operator that the battery has reached the predetermined test conditions. Then all the operator has to do is to press push-button switch 14 to close the circuit through calibrated discharge resistance 13, whereupon a heavy current of predetermined value will flow from battery 8. The meter 15 will then indicate the terminal voltage. This meter should, of course, have the correct range, which can be secured by means well known to the art. Its scale may be calibrated so that the point reached by testing a new, fully-charged battery of the same size as battery 8, and having the same temperature (130°) may be marked 100%. Any other battery of the same size, in perfect condition, and at the same temperature, will also produce an indication of 100%. A less perfect battery of the same size at the same temperature will give a correspondingly lower reading, which is its capacity as compared with what it was when new.

It will be noted that this tester is designed to test a battery only at a certain predetermined temperature and includes means for creating this temperature, and for then comparing it with the capacity of a new battery under exactly the same conditions. Since the only valuable information is how much a battery has deteriorated from its original perfect state, this tester supplies it in a most simple, direct and accurate manner in a minimum of time. The customer is delayed only a comparatively few minutes, and drives away not only knowing what state his battery is in, but also that it does not need recharging.

The basic circuit shown in the drawing can, of course, be used for testing only one size of battery 8 because discharge resistance 13 should be of some other value for a larger or smaller battery. However, the tester can be adapted for testing batteries of several sizes by substituting for the single discharge resistance 13, a plurality of discharge resistances, and a switch for so connecting them into the circuit that the equivalent discharge load for any of the batteries for which the tester is designed can be included in the circuit. In this way all of the batteries can be reduced to a common denominator so that meter 15 will accurately indicate the capacity of any of them as compared with what it was when new. Such devices, commonly called battery size selectors, are known to the art and certain improved forms thereof are the subject of other patent applications heretofore filed by me.

Various other refinements may be added to the circuit disclosed herein, without altering, however, its fundamental character or mode of operation.

I claim:

1. A method of testing a storage battery by comparing its capacity with its original rated capacity which comprises fast charging the surface of the plates of the battery to the equivalent of a fully charged condition, and in so charging raising its internal temperature to a predetermined degree, then drawing a current of predetermined high value from said battery at said temperature, and simultaneously determining the terminal voltage of the battery.

2. A method of testing a storage battery by comparing its capacity with its original rated capacity which comprises fast charging the surface of the plates of the battery to the equivalent of a fully charged condition, and in so charging raising its internal temperature to a predetermined degree, stopping the charging of the battery when the predetermined temperature has been reached, indicating when said temperature has been reached, then drawing a current of predetermined high value from said battery at said temperature, and simultaneously determining the terminal voltage of the battery.

3. A method of testing batteries comprising charging an automotive type battery with a current of from 50 to 125 amperes until the temperature of the electrolyte reaches about 130° F., terminating the charging current and measuring the terminal voltage of the battery while discharging the battery at a predetermined rate of from 100 to 300 amperes and while the battery electrolyte is at a temperature of about 130° F.

4. A combined storage battery tester and charger for charging and testing an automotive battery without removing it from the vehicle comprising a charger for charging a battery at a current of 50 to 125 amperes, said charger having an output circuit, including leads for detachable connection to the terminals of a battery, an input circuit including a thermostatic switch for immersion in the electrolyte of the battery to be charged and operable to break the input circuit at a predetermined electrolyte temperature, indicator means for indicating that the charging has terminated and that the electrolyte of the battery is at said predetermined temperature, and a tester including a resistor of low resistance for discharging a battery at a predetermined current between 100 and 300 amperes, a circuit including a contactor for shunting said resistor across said leads and a voltmeter connected for measuring the drop across said resistor said tester being calibrated for testing at said predetermined temperature.

5. A combined storage battery tester and charger for charging and testing an automotive battery without removing it from the vehicle comprising a charging device for charging a battery at a rate of 50 to 125 amperes having output terminals, a thermostatic switch for immersion in the electrolyte of the battery for terminating the operation of the charger upon the electrolyte reaching a predetermined temperature, indicator means for indicating that the charging has terminated and that the electrolyte of the battery is at said predetermined temperature, a resistor of low resistance for discharging a battery at a predetermined current between 100 and 300 amperes, a voltmeter shunted across the resistor, and leads common to the charging device and resistor for connecting the output terminals of the charging device and the terminals of the resistor to the terminals of the battery.

6. In a storage battery capacity tester, a circuit connected to a source of alternating current and to the battery for applying to the battery under test a high charging current which will rapidly charge the surface of the plates of the battery to the equivalent of a fully charged condition, and in so charging raise the internal temperature of the battery to a predetermined degree, a thermo-electric switch contained within a suitable housing immersible in the electrolyte of said battery and adapted to open said circuit when said battery reaches said temperature to terminate charging, means for indicating that said charging has terminated and that the battery electrolyte is at said temperature, predetermined temperature has been reached, a second circuit also connectible to said battery and including a resistance of predetermined value for drawing from said battery a high current of predetermined value, said second circuit being normally open, means for closing said second circuit, and a voltmeter bridged across said battery for determining its terminal voltage when said second circuit is closed and calibrated for use with batteries at said predetermined temperature.

7. A storage battery capacity tester comprising means for charging a storage battery at a high rate, temperature responsive means for terminating the charging of the battery when a predetermined electrolyte temperature has been reached, indicator means for indicating that the charging has terminated and that the electrolyte of the battery is at said predetermined temperature, and capacity testing means connectible to the battery for discharging the same at a high rate and determining the potential of the same while discharging, said testing means being calibrated for testing batteries while at said predetermined temperature.

BENJAMIN F. W. HEYER.